(12) United States Patent
Lavoie et al.

(10) Patent No.: US 11,611,694 B2
(45) Date of Patent: Mar. 21, 2023

(54) VEHICLE CONTROL SYSTEMS AND METHODS AND OPTICAL TETHERING TECHNIQUES

(71) Applicant: Ford Global Technologies, LLC, Dearborn, MI (US)

(72) Inventors: Erick Lavoie, Van Buren Charter Township, MI (US); Hemanth Yadav Aradhyula, Farmington Hills, MI (US); Siyuan Ma, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 17/193,590

(22) Filed: Mar. 5, 2021

(65) Prior Publication Data

US 2022/0286619 A1    Sep. 8, 2022

(51) Int. Cl.
*H04N 5/232* (2006.01)
*G05D 1/00* (2006.01)

(52) U.S. Cl.
CPC ....... *H04N 5/232127* (2018.08); *G05D 1/005* (2013.01); *G05D 1/0038* (2013.01); *G05D 1/0055* (2013.01); *H04N 5/23222* (2013.01)

(58) Field of Classification Search
CPC ......... H04N 5/232127; H04N 5/23222; G05D 1/0038; G05D 1/005; G05D 1/0055
USPC ........................................................ 348/135
See application file for complete search history.

(56) References Cited

U.S. PATENT DOCUMENTS

| 10,688,918 | B2 | 6/2020 | Elangovan et al. |
| 2008/0044171 | A1* | 2/2008 | Hyatt ............... H04N 5/232933 348/E5.025 |
| 2018/0345851 | A1* | 12/2018 | Lavoie .................. B60Q 9/006 |
| 2019/0154439 | A1 | 5/2019 | Binder |
| 2020/0195833 | A1 | 6/2020 | Sivan |

FOREIGN PATENT DOCUMENTS

| DE | 10037128 A1 | 5/2001 |
| WO | 2019185097 A1 | 10/2019 |

OTHER PUBLICATIONS

Porsche Irvine, "Porsche Remote Park Assist", 2020, 2 pages, My Porsche, 14500 Scientific Way, Irvine, CA 92618.

* cited by examiner

*Primary Examiner* — Allen C Wong
(74) *Attorney, Agent, or Firm* — Frank Lollo; Eversheds Sutherland (US) LLP (57) ABSTRACT

The present disclosure generally relates to vehicle remote parking assistance, and, more specifically, systems and methods for determining a distance between a vehicle and a mobile device during a remote parking procedure. In particular, the systems and methods include selecting a camera lens or focal length for use with a first method of determining a distance between a vehicle and a mobile device based on an image of the vehicle and a digital model of the vehicle.

20 Claims, 3 Drawing Sheets

VEHICLE CONTROL SYSTEMS AND METHODS AND OPTICAL TETHERING TECHNIQUES

BACKGROUND

Vehicles may include the ability to remotely drive themselves with no or only minor control from a user. Some vehicles may be able to park themselves while an owner or driver watches from outside the vehicle and provides no or minimal motion control. In these instances, the driver may initiate the remote parking operation from a mobile device in communication with the vehicle. The mobile device may thus be able to control one or more aspects of the vehicle remotely.

In these cases of remote control of the vehicle, the user may be required to remain within a certain distance of the vehicle while controlling the vehicle. Some states, countries, or other jurisdictions may require that a driver be within a threshold distance from the vehicle in order to allow this remote parking feature to take place. For instance, a regulation or law may require a driver to be within 10 meters of the vehicle during operation of the remote parking feature and may require that the vehicle stop if the driver is too far away.

It is with respect to these and other considerations that the disclosure made herein is presented.

DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure generally relates to vehicle remote parking assistance and, more specifically, systems and methods for determining a distance between a vehicle and a mobile device during a remote parking procedure by selecting a lens and focal length of the mobile device and zoom configuration for optical tethering between the mobile device and the vehicle. In particular, the systems and methods include selecting a camera lens and/or focal length for use with a first method of determining a distance between a vehicle and a mobile device based on an image of the vehicle and a digital model of the vehicle.

Figure 1:
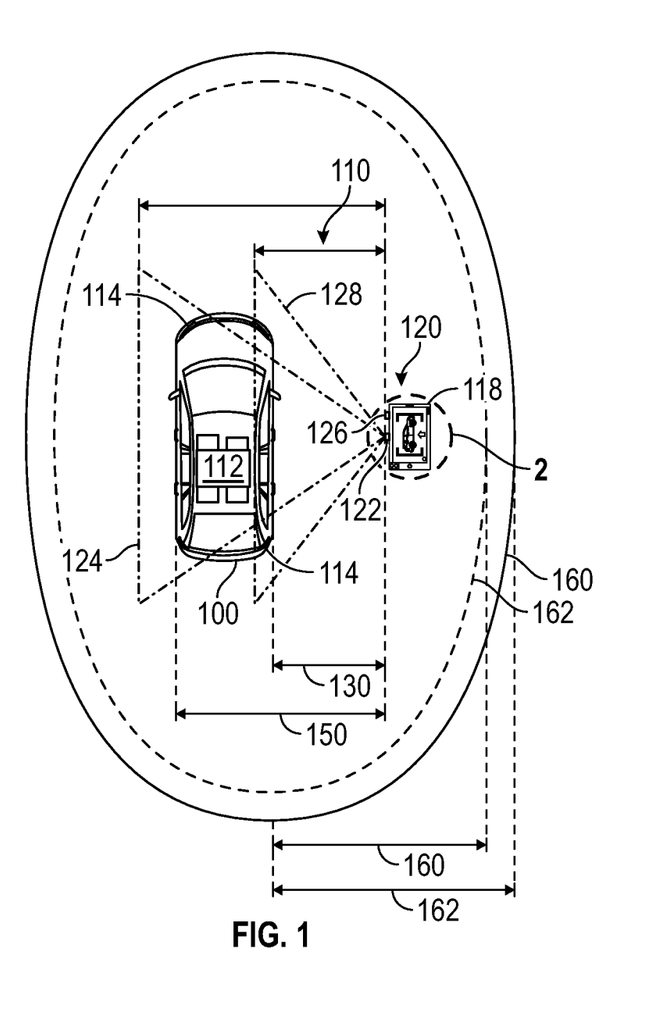
FIG. 1 depicts a vehicle control system for controlling a vehicle with a mobile device in accordance with the present disclosure.

An exemplary vehicle control system 110 includes a vehicle 100 including a vehicle computer 112 and marker features 114. The vehicle control system 110 also includes a mobile device 118 including at least one camera 120 (and in some instances a plurality of cameras). The camera 120 includes at least one lens (and in some instances a plurality of lenses) and a plurality of focal lengths.

Focal length relates to the angle of view (or field of view), which is how much of a scene will be captured, and the magnification, which is how large individual elements will be. The longer the focal length, the narrower the angle of view and the higher the magnification. The shorter the focal length, the wider the angle of view and the lower the magnification.

For purposes of illustration, the camera 120 includes a first lens 122 with a first focal length (represented by a first field of view 124) and a second lens 126 with a second focal length (represented by a second field of view 128) where the first focal length is longer than the second focal length. In some cases, the camera 120 may include a zoom lens with a variable focus length.

The vehicle control system 110 is configured to determine a distance 130 between the vehicle 100 and the mobile device 118 during a remote parking procedure or other Remote Driver Assist Technology (ReDAT) operation.

Figure 2:
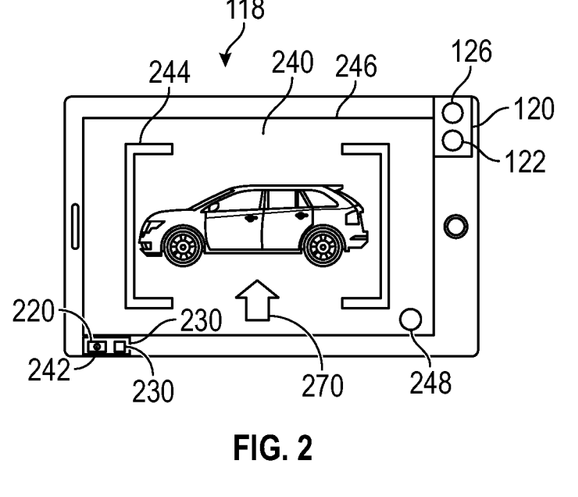
FIG. 2 is a schematic illustration of the mobile device of FIG. 1 in accordance with the present disclosure.

A first method of determining the distance 130 is based on an image 240 of the vehicle 100 from the camera 120 of the mobile device 118 and a 3D model 242 of the vehicle 100. The vehicle 100 may transmit the 3D model 242 of the vehicle 100 to the mobile device 118. The mobile device 118 is configured to receive the 3D model 242, capture an image 240 of the vehicle 100 with the camera 120, and determine a distance 130 between the mobile device 118 and vehicle 100 based on the image 240 and the 3D model 242.

In particular, the mobile device 118 may overlay a graphic 244 over the image 240 on a display 246 of the mobile device 118. The overlayed graphic 244 designates where to position an image of the vehicle 100 on within the image 240 or display 246 when performing the first method of determining the distance 130. For example, the first method is configured to use a portion of the image 240 that is within a boundary defined by the graphic 244.

The mobile device 118 may also display a touchpoint 248 on the display 246. For example, the user must maintain contact with the touchpoint 248 to use the vehicle control system 110.

A second method of determining the distance 130 can include using an image from a camera of the vehicle 100 (e.g., imaging techniques to detect face or posture of a user, or to detect the mobile device 118), a strength of a wireless connection between the vehicle 100 and the mobile device 118 (e.g., Bluetooth or Wi-Fi), low frequency (LF) antennas to triangulate the position of a LF key fob, determining the distance based on a calculated trajectory of the vehicle 100 and a calculated trajectory of the mobile device 118, combinations thereof, and the like.

According to an exemplary method, the mobile device may select a lens 122, 126, based on the distance 130, for use with the first method of determining the distance 130. The distance 130 for selecting a lens 122, 126 may be determined by the first method or a second method. For example, if the distance 130 is greater than a focal length threshold distance 150, the first lens 122 with the longer focal length and the narrower field of view 124 is selected. Alternatively, if the distance 130 is less than the focal length threshold distance 150, the second lens 126 with the shorter focal length and the wider field of view 128 is selected.

The focal length threshold distance 150 may be selected such that a portion of the vehicle 100 (including the entire vehicle 100) that facilitates performing the first method (e.g., identifying marker features 114 in the image 240) is within the field of view 124, 128. The focal length threshold distance 150 may also be selected such that a the portion of the vehicle 100 that facilitates performing the first method (e.g., identifying marker features 114 in the image 240) is shown with sufficient magnification.

If the mobile device 118 is unable to perform the first method with the selected lens (e.g., first lens 122) may switch to a wider lens (e.g., second lens 126) and/or provide instructions to the user via a display of the mobile device 118 such that the image of the vehicle 100 is positioned in the overlay graphic 244.

If the distance 130 is not known or is subject to an error calculation such that the distance 130 may not be reliably compared to the focal length threshold distance 150, the second lens 126 with the shorter focal length and the wider field of view 128 may be initially selected as a default.

The distance 130 may be compared to a threshold operational distance 160 (e.g., 6 meters) that determines if the vehicle control system 110 can be used to control the vehicle 100. For example, if the calculated distance 130 is greater than the threshold operational distance 160, control with the mobile device 118 is disabled until the distance 130 is less than the threshold operational distance 160.

The mobile device 118 may display the graphic 244 with a color (or other indicator including visual, audible, and tactile indicators) based a status when performing the first method of determining the distance 130. For example, if a status is that the distance 130 is not determined by the first method, the color of the graphic 244 may be red. If a status is that the distance 130 is determined by the first method, the color of the graphic 244 may be green.

If the distance 130 nears the threshold operational distance 160 (e.g., distance 130 is greater than a warning distance 162), the color of the graphic 244 may be yellow. In addition, the mobile device 118 may provide additional notices including text, audible warnings or instructions, additional graphics overlayed on the image 240 such as an arrow 270, vibration or other haptic signals, zoom sequences, combinations thereof, and the like. Similarly, the mobile device 118 may provide these or similar notices if the distance 130 exceeds the threshold operational distance 160.

These and other advantages of the present disclosure are provided in greater detail herein.

ILLUSTRATIVE EMBODIMENTS

The disclosure will be described more fully hereinafter with reference to the accompanying drawings, in which exemplary embodiments of the disclosure are shown, and not intended to be limiting.

The vehicle control system 110 includes the vehicle 100 and the mobile device 118. The vehicle 100 includes the vehicle computer 112 and marker features 114. The vehicle control system 110 is described in further detail with respect to FIG. 4.

The vehicle 100 may take the form of another passenger or commercial automobile such as, for example, a truck, a car, a sport utility vehicle, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 100 may be configured as an electric vehicle (EV). More particularly, the vehicle 100 may include a battery EV (BEV) drive system. The vehicle 100 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 100 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 100 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5.

An autonomous vehicle (AV) having Level 1 autonomy may generally include a single automated driver assistance feature, such as steering or acceleration assistance. Adaptive cruise control is one such example of a Level-1 autonomous system that includes aspects of both acceleration and steering.

Level-2 autonomy in vehicles may provide partial automation of steering and acceleration functionality, where the automated system(s) are supervised by a human driver that performs non-automated operations such as braking and other controls.

Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task.

Level 4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure.

Level 5 autonomy is associated with autonomous vehicle systems that require no human input for operation, and generally do not include human operational driving controls.

The mobile device 118 includes a mobile device computer 210 (e.g., as described with respect to vehicle computer 112), the touchscreen display 246, and the camera 120. The mobile device computer 210 includes a memory 220 and a processor 230. The memory 220 include the digital model 242 and computer executable instruction that, when execute by the processor 230, cause the processor to perform methods described herein.

Broadly, the mobile device 118 is configured to interact with the vehicle 100.

The camera 120 includes at least one lens and a plurality of focal lengths. Focal length relates to the angle of view (or field of view), which is how much of a scene will be captured, and the magnification, which is how large individual elements will be. The longer the focal length, the narrower the angle of view and the higher the magnification. The shorter the focal length, the wider the angle of view and the lower the magnification.

For purposes of illustration, the camera 120 includes the first lens 122 with the first focal length (represented by the first field of view 124) and the second lens 126 with the second focal length (represented by the second field of view 128) where the first focal length is longer than the second focal length. In some cases, the camera 120 may include a zoom lens with variable focus lengths.

The mobile device 118 may overlay the graphic 244 over the image 240 on the display 246 of the mobile device 118. The overlayed graphic 244 designates where to position the vehicle 100 within the image 240 when performing the first method of determining the distance 130. For example, first method is configured to use a portion of the image 240 that is within a boundary defined by the graphic 244.

The mobile device 118 may also display a touchpoint 248 on the display 246. For example, the user must maintain contact with the touchpoint 248 to use the vehicle control system 110.

The vehicle control system 110 is configured to determine a distance 130 between the vehicle 100 and the mobile device 118 during a remote parking procedure. The distance 130 may be compared to the threshold operational distance 160 (e.g., 6 meters). The threshold operational distance 160 is a maximum distance at which the vehicle control system 110 can be used to control the vehicle 100. For example, if the distance 130 is greater than the threshold operational distance 160, control of the vehicle 100 with the mobile device 118 is disabled by the vehicle control system 110 until the distance 130 is less than the threshold operational distance 160.

The vehicle control system 110 is configured to determine a distance 130 between the vehicle 100 and the mobile device 118 during a remote parking procedure.

A first method of determining the distance 130 is based on an image 240 of the vehicle 100 from the camera 120 of the mobile device 118 and the digital model 242 of the vehicle 100. The vehicle 100 may transmit the digital model 242 of the vehicle 100 to the mobile device 118. The mobile device 118 is configured to receive the digital model 242, capture an image 240 of the vehicle 100, and determine a distance 130 between the mobile device 118 and vehicle 100 based on the image 240 and the digital model 242.

In particular, the vehicle 100 may include marker features 114 (e.g., lights) at marker locations. Each marker location on the vehicle 100 is associated with a coordinate of a vehicle coordinate system (e.g., of the digital model 242) such that the marker locations, and distances and spatial relationships between the marker features 114, are known.

Each marker feature 114 includes a unique pattern and/or other marker characteristics that are configured to be detected by image processing, pattern recognition, and/or other computer vision techniques. The marker feature 114 can be read to access associated marker information such as a name of the marker feature 114, the marker location, and spatial relationships (e.g., distances to, directions to) with other marker features 114.

The camera 120 is configured to capture the camera image 240 (e.g., image data) of the vehicle 100 and the marker features 114. The mobile device 118 is configured to determine an image location of each marker feature 114 in the camera image 240 on a screen coordinate system.

The mobile device 118 includes a computer vision application that is configured to perform image processing, pattern recognition, and/or other computer vision techniques to read the marker features 114 in the camera image 240 and obtain the marker locations of each marker feature 114 from the associated marker information.

The mobile device 118 determines a transformation matrix (e.g., a camera model) that relates the image location of a marker feature 114 in the camera image 240 and the marker location of the marker feature 114 (e.g., of the digital model 242). The transformation matrix reflects the pose of the camera 120 including the location and the orientation of the camera 120.

The orientation of the camera 120 can be expressed as a rotation matrix (e.g., as rotation angles). The location of the camera 120 can be expressed by a translation vector. The transformation matrix may also include camera-specific adjustments such as for focal length, image sensor orientation, and size.

As the image locations of marker features 114 are known (e.g., determined from the camera image 240) and the marker locations of the marker features 114 are known (e.g., the marker location is accessed from the marker information), the elements of the transformation matrix may be determined, for example, using an iterative optimization method. A pose of the camera 120, including the orientation and location of the camera 120, can be determined from the elements of the transformation matrix.

The distance 130 can be determined from the location of the camera 120.

A second method of determining the distance 130 may be based on using an image from a camera of the vehicle 100 (e.g., imaging techniques to detect face, posture, the mobile device 118), a strength of a wireless connection between the vehicle 100 and the mobile device 118 (e.g., Bluetooth or Wi-Fi), low frequency (LF) antennas to triangulate the position of a LF key fob or the mobile device 118, based on a calculated trajectory of the vehicle 100 and a calculated trajectory of the mobile device 118, combinations thereof, and the like.

An error in the distance calculation accumulates over time and is also calculated. If the error calculation becomes greater than a threshold error, another method of measuring distance may need to be used. The method that is used may be selected based on lowest amount of error.

Figure 3:
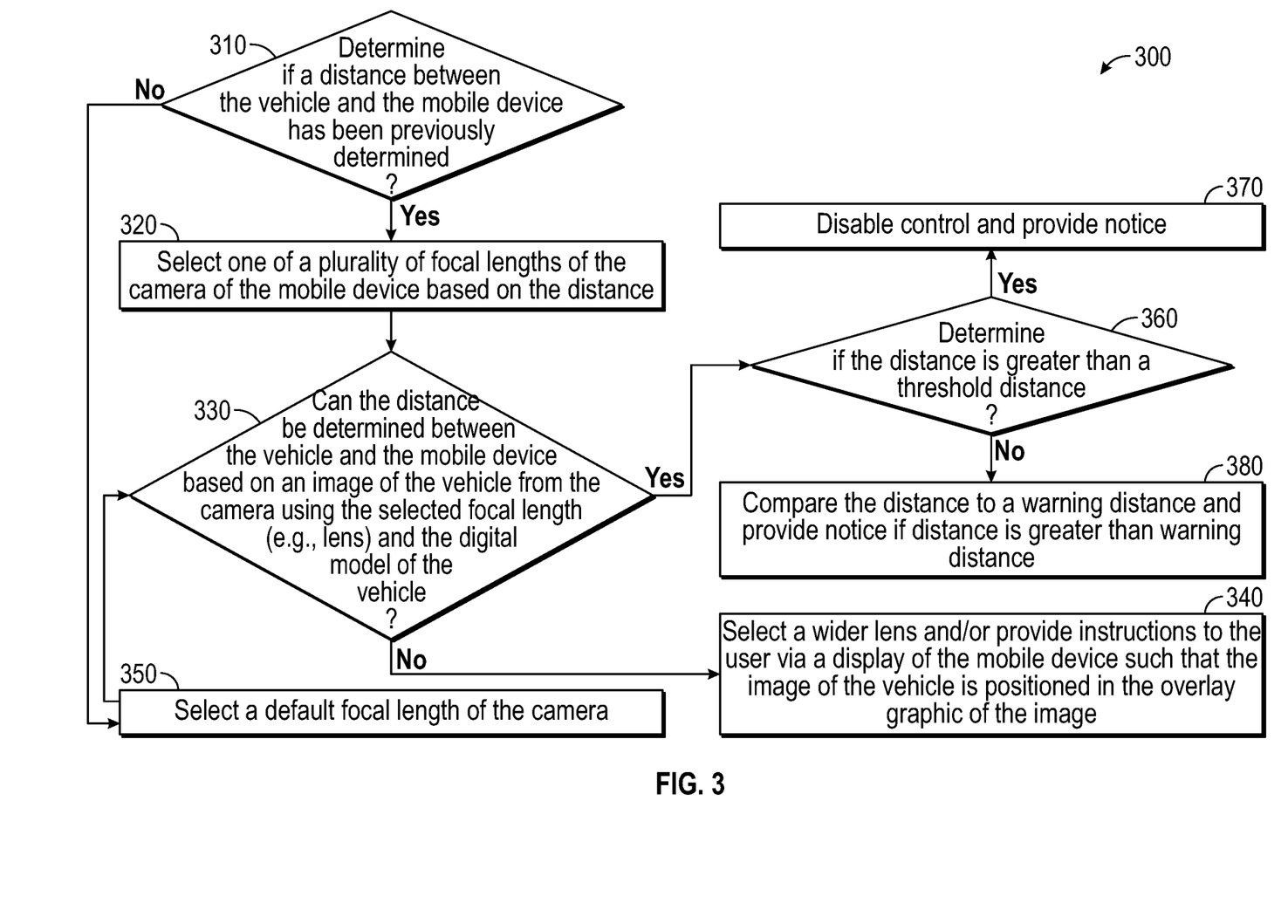
FIG. 3 is a flow chart of an exemplary method in accordance with the present disclosure.

Referring to FIG. 3, the vehicle control system 110 may perform an exemplary method 300. According to a first step 310, the vehicle control system 110 may determine if the distance 130 between the vehicle 100 and the mobile device 118 has been previously determined. For example, the distance 130 may have been previously determined according to the first method or a second method described above.

According to a second step 320, if the distance 130 between the vehicle 100 and the mobile device 118 has been previously determined, the mobile device 118 selects one of a plurality of focal lengths of the camera 120 (e.g., one of the lenses 122, 126) of the mobile device 118 based on the distance 130.

For example, if the previously determined distance 130 is greater than the focal length threshold distance 150, the first lens 122 with the longer focal length and the narrower field of view 124 is selected. Alternatively, if the distance 130 is less than the focal length threshold distance 150, the second lens 126 with the shorter focal length and the wider field of view 128 is selected.

The focal length threshold distance 150 may be set such that a portion of the vehicle 100 (including the entire vehicle 100) that facilitates performing the first method (e.g., identifying marker features 114 in the image 240) is within the field of view 124, 128 and/or has sufficient magnification.

According to a third step 330, the mobile device 118 performs the first method to determine if a current distance 130 can be determined based on an image 240 of the vehicle 100 from the camera 120 using the selected focal length (e.g., lens) and the digital model 242 of the vehicle 100.

According to a fourth step 340, if the mobile device 118 is unable to determine the distance 130 according to the first method with the selected lens (e.g., first lens 122), the mobile device 118 may switch to a wider lens (e.g., second lens 126) and/or provide instructions to the user via a display of the mobile device 118 such that the image of the vehicle 100 is positioned in the overlay graphic 244. The method 300 may return to step 330 after step 340.

Following the first step 310, according to a fifth step 350, if the distance 130 is not previously determined or is subject to an error calculation (e.g., too much time has elapsed since the distance was previously determined or the distance was determined according to a method with a large amount of error) such that the distance 130 may not be reliably compared to the focal length threshold distance 150, the second lens 126 with the shorter focal length and the wider field of view 128 may be initially selected as a default. The method 300 may proceed to step 330 from step 350.

The mobile device 118 may display the graphic 244 with a color (or other indicator including visual, audible, and tactile indicators) based a status when performing the first method of determining the distance 130. For example, if a status is that the distance 130 is not determined by the first method (e.g., at fourth step 340 or fifth step 350), the color of the graphic 244 may be red.

According to a sixth step 360, the vehicle control system 110 determines if the distance 130 is greater than the threshold operational distance 160 (e.g., 6 meters) to determine if the vehicle control system 110 can be used to control the vehicle 100.

According to a seventh step 370, if the distance 130 is greater than the threshold operational distance 160, control with the mobile device 118 is disabled until the distance 130 is less than the threshold operational distance 160. Here, the mobile device 118 may provide notices including text, audible warnings or instructions, additional graphics overlayed on the image 240 such as an arrow 170, vibration or other haptic signals, zoom sequences, combinations thereof, and the like.

According to an eighth step 380, if the distance 130 is less than the threshold operational distance 160, the distance 130 is compared to the warning distance 162. If the distance 130 is less than the warning distance 162, the color of the graphic 244 may be green. If the distance 130 is greater than the warning distance 162, the color of the graphic 244 may be yellow and/or the mobile device 118 may provide additional notices as described with respect to step 370 to attempt to prevent the distance 130 from exceeding the threshold operational distance 160.

Figure 4:
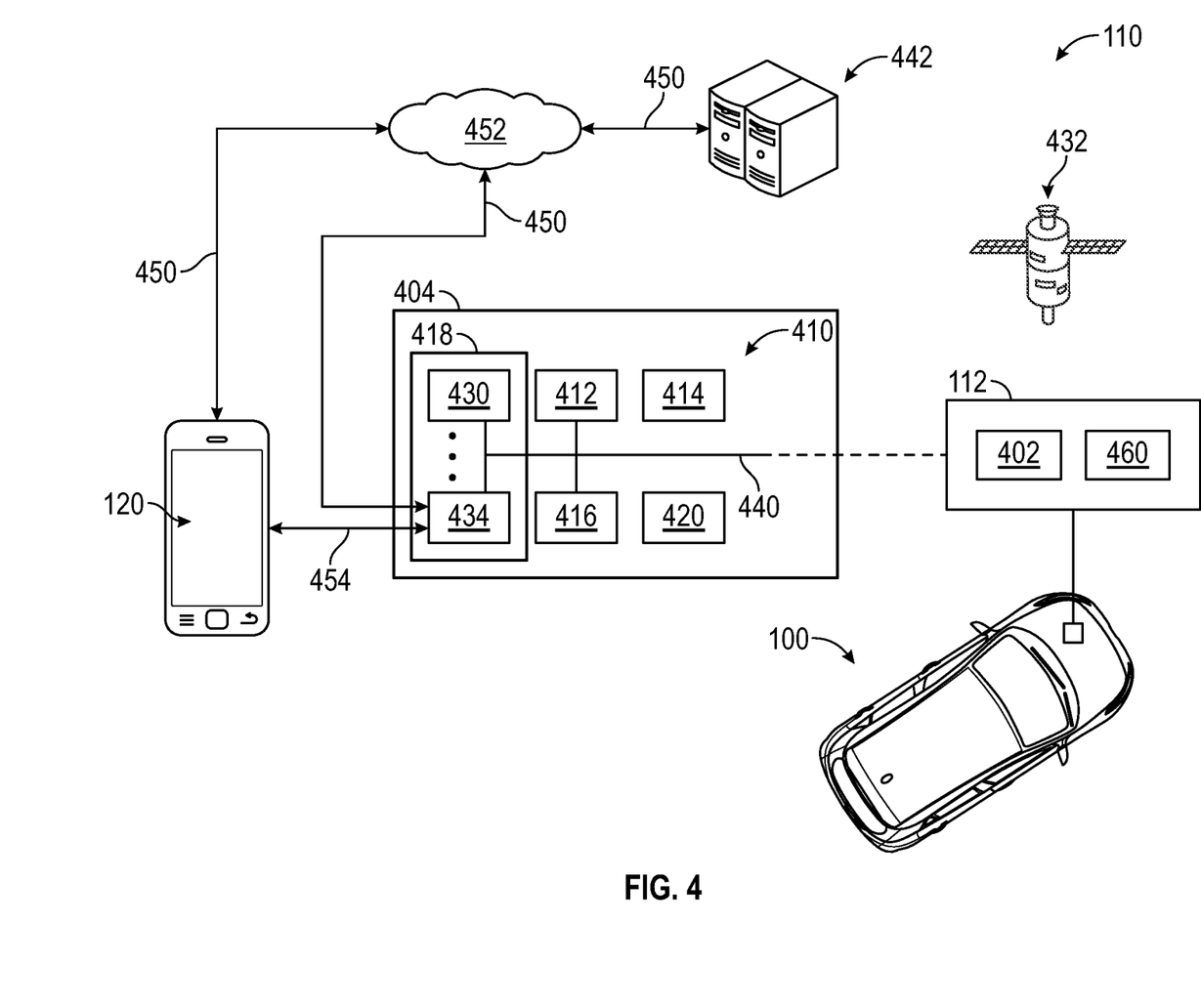
FIG. 4 depicts the vehicle control system of FIG. 1 in accordance with the present disclosure.

Referring to FIG. 4, the vehicle control system 110 is described in greater detail.

The vehicle computer 112 includes computer components including a memory (e.g., memory 400) and a processor (e.g., a processor 402).

A processor may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs).

A memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

Memory is computer readable media on which one or more sets of instructions, such as the software for performing the methods of the present disclosure, can be embedded. The instructions may embody one or more of the methods or logic as described herein. The instructions may reside completely, or at least partially, within any one or more of the memory, the computer readable medium, and/or within the processor during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The vehicle 100 includes a vehicle control unit (VCU) 404, the VCU 404 includes a plurality of electronic control units (ECUs) 410 disposed in communication with the vehicle computer 112. The VCU 404 may coordinate the data between vehicle systems, connected servers, and other vehicles operating as part of a vehicle fleet. The VCU 404 may control aspects of the vehicle 100, and implement one or more instruction sets (e.g., method 300) received from a vehicle system controller (such as vehicle computer 112).

The VCU 404 can include or communicate with any combination of the ECUs 410, such as, for example, a Body Control Module (BCM) 412, an Engine Control Module (ECM) 414, a Transmission Control Module (TCM) 416, the Telematics Control Unit (TCU) 418, a Restraint Control Module (RCM) 420, and the like. The TCU 418 may be disposed in communication with the ECUs 410 by way of a Controller Area Network (CAN) bus 440. In some aspects, the TCU 418 may retrieve data and send data as a CAN bus 440 node.

The CAN bus 440 may be configured as a multi-master serial bus standard for connecting two or more of the ECUs 410 as nodes using a message-based protocol that can be configured and/or programmed to allow the ECUs 410 to communicate with each other. The CAN bus 440 may be or include a high-speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 410 may communicate with a host computer (e.g., the vehicle computer 112, server(s), etc.), and may also communicate with one another without the necessity of a host computer.

The CAN bus 440 may connect the ECUs 410 with the vehicle computer 112 such that the vehicle computer 112 may retrieve information from, send information to, and otherwise interact with the ECUs 410 to perform steps described according to embodiments of the present disclosure. The CAN bus 440 may connect CAN bus nodes (e.g., the ECUs 410) to each other through a two-wire bus, which may be a twisted pair having a nominal characteristic impedance. The CAN bus 440 may also be accomplished using other communication protocol solutions, such as Media Oriented Systems Transport (MOST) or Ethernet. In other aspects, the CAN bus 440 may be a wireless intra-vehicle CAN bus.

The VCU 404 may control various loads directly via the CAN bus 440 communication or implement such control in conjunction with the BCM 412. The ECUs 410 described with respect to the VCU 404 are provided for exemplary purposes only, and are not intended to be limiting or exclusive. Control and/or communication with other control modules is possible, and such control is contemplated.

The ECUs 410 may control aspects of vehicle operation and communication using inputs from human drivers, inputs from a vehicle system controller, and/or via wireless signal inputs received via wireless channel(s) from other connected devices. The ECUs 410, when configured as nodes in the CAN bus 440, may each include a central processing unit (CPU), a CAN controller, and/or a transceiver.

The TCU 418 can be configured to provide vehicle connectivity to wireless computing systems onboard and offboard the vehicle 100 and is configurable for wireless communication between the vehicle 100 and other systems, computers, servers, devices, and modules.

For example, the TCU 418 includes a Navigation (NAV) system 430 for receiving and processing a GPS signal from a GPS 432, a Bluetooth® Low-Energy Module (BLEM) 434, a Wi-Fi transceiver, an Ultra-Wide Band (UWB) transceiver, and/or other wireless transceivers described in further detail below for using near field communication (NFC) protocols, Bluetooth® protocols, Wi-Fi, Ultra-Wide Band (UWB), and other possible data connection and sharing techniques.

The TCU 418 may include wireless transmission and communication hardware that may be disposed in communication with one or more transceivers associated with telecommunications towers (e.g., cellular towers) and other wireless telecommunications infrastructure. For example, the BLEM 434 may be configured and/or programmed to receive messages from, and transmit messages to, one or more cellular towers associated with a telecommunication provider, and/or and a Telematics Service Delivery Network (SDN) associated with the vehicle 100 for coordinating vehicle fleet.

The BLEM 434 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 434 may include Generic Attribute Profile (GATT) device connectivity for client devices that respond to or initiate GATT commands and requests.

External servers (e.g., servers 442) may be communicatively coupled with the vehicle 100 and the mobile device 118 via one or more network(s) 452, which may communicate via one or more wireless channel(s) 450. The wireless channel(s) 450 are depicted in FIG. 4 as communicating via the one or more network(s) 452.

The mobile device 118 may be connected with the vehicle 100 via direct communication (e.g., channel 454) using near field communication (NFC) protocols, Bluetooth® protocols, Wi-Fi, Ultra-Wide Band (UWB), and other possible data connection and sharing techniques.

The network(s) 452 illustrate example communication infrastructure in which the connected devices discussed in various embodiments of this disclosure may communicate. The network(s) 452 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, WiMAX (IEEE 802.16m), Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), Universal Mobile Telecommunications System (UMTS), Long Term Evolution (LTE), and the like.

The NAV system 430 may be configured and/or programmed to determine the vehicle location. The NAV system 430 may include a Global Positioning System (GPS) receiver configured or programmed to triangulate the vehicle location relative to satellites or terrestrial based transmitter towers associated with the GPS 432.

The NAV system 430 may be further configured or programmed to develop routes from a current vehicle location to a selected destination, display a map and present directions to the selected destination, and determine an estimated time to travel to the selected location and a predicted time of arrival. The estimated time of arrival may be based on the position, speed, and heading or other vehicle information determined by the NAV system 430.

The BCM 412 generally includes an integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 412 may also operate as a gateway for bus and network interfaces to interact with remote ECUs.

The BCM 412 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc. The BCM 412 may be configured for vehicle energy management, exterior lighting control, wiper functionality, power window and door functionality, heating ventilation and air conditioning systems, and driver integration systems.

In other aspects, the BCM 412 may control auxiliary equipment functionality, and/or is responsible for integration of such functionality. In one aspect, a vehicle having a vehicle control system may integrate the system using, at least in part, the BCM 412. For example, the BCM 412 may be used to control vehicle systems according to the determined distance 130.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation. All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments

What is claimed is:

1. A system, comprising:
   a vehicle;
   a mobile device comprising a camera having a plurality of focal lengths;
   a digital model of the vehicle; and
   a processor and a memory comprising instructions that, when executed by the processor, are configured to cause the processor to:
   select, based on a distance previously determined between the vehicle and the mobile device, a first focal length of the plurality of focal lengths; and
   redetermining the distance between the vehicle and the mobile device by performing a first method based on an image of the vehicle from the camera using the first focal length and the digital model of the vehicle.

2. The system of claim 1, wherein the instructions comprise determining if the distance is greater than a threshold operational distance.

3. The system of claim 2, wherein the instructions comprise disabling control of the vehicle with the mobile device if the distance is greater than the threshold operational distance.

4. The system of claim 1, wherein selecting the first focal length comprises:
   selecting a first one of the plurality of focal lengths if the distance is greater than a threshold focal length distance; and
   selecting a second one of the plurality of focal lengths if the distance is less than the threshold focal length distance.

5. The system of claim 4, wherein the first one of the plurality of focal lengths is longer than the second one of the plurality of focal lengths.

6. The system of claim 1, wherein the instructions comprise selecting, if the distance is unable to be redetermined according to the first method with the first focal length, a second focal length of the plurality of focal lengths and again performing the first method using the second focal length to redetermine the distance.

7. The system of claim 6, wherein the second focal length is less than the first focal length.

8. The system of claim 1, wherein the instructions comprise providing, if the distance is unable to be redetermined according to the first method with the first focal length, directions to a user via a display of the mobile device and again performing the first method to redetermine the distance.

9. The system of claim 1, wherein the instructions comprise selecting, if the distance has not been previously determined, a default one of the plurality of focal lengths.

10. The system of claim 9, wherein the distance has not been previously determined based on an error calculation.

11. The system of claim 9, wherein the default one of the plurality of focal lengths is a shorter one of the plurality of focal lengths.

12. The system of claim 1, wherein the mobile device is configured to overlay a graphic over the image from the camera on a display of the mobile device.

13. The system of claim 12, wherein the first method is configured to use a portion of the image that is within a boundary defined by the graphic.

14. The system of claim 12, wherein the instructions comprise displaying the graphic with a first color if the distance is less than a threshold operational distance and less than a warning distance.

15. The system of claim 14, wherein the instructions comprise displaying the graphic with a second color if the distance is less than the threshold operational distance and greater than the warning distance.

16. The system of claim 1, wherein the distance is previously determined based on at least one of a vehicle camera, a strength of a wireless connection between the vehicle and the mobile device, triangulating signals from low frequency (LF) antennas, and/or a trajectory of the vehicle and a trajectory of the mobile device.

17. The system of claim 1, wherein the camera includes a plurality of lenses with different focal lengths.

18. A method, comprising:
   determining a distance between a vehicle and a mobile device;
   selecting, based on the distance between the vehicle and the mobile device, a first focal length of a plurality of focal lengths of a camera of the mobile device; and
   redetermining the distance between the vehicle and the mobile device by performing a first method based on an image of the vehicle from the camera using the first focal length and a digital model of the vehicle.

19. The method of claim 18, wherein selecting the first focal length comprises:
   selecting a first one of the plurality of focal lengths if the distance is greater than a threshold focal length distance; and
   selecting a second one of the plurality of focal lengths if the distance is less than the threshold focal length distance, wherein the first one of the plurality of focal lengths is longer than the second one of the plurality of focal lengths.

20. The method of claim 18, further comprising selecting, if the distance is unable to be redetermined according to the first method with the first focal length, a second focal length of the plurality of focal lengths and again performing the first method using the second focal length to redetermine the distance.

* * * * *